Patented June 6, 1939

2,161,238

UNITED STATES PATENT OFFICE 2,161,238

PRESERVE BASE

James H. Stanton, Vancouver, British Columbia, Canada

No Drawing. Application July 7, 1937, Serial No. 152,454. In Canada February 8, 1937

3 Claims. (Cl. 99—129)

This invention relates to improvements in fruit preserve bases. The objects of the invention are to produce a preserve base which can be put up in block, semi-solid or liquid form, which will keep almost indefinitely and retain its flavor, and which can be used by the housewife to produce jams or marmalade by the simple addition of water and sugar and boiling same for a very short time, approximately one minute, when the product is ready for packing in jars or other containers.

The invention consists essentially of concentrating the fruit to be used by extracting the water therefrom and combining with it a vegetable compound capable of absorbing the residual moisture and preserving said fruit juice and fruit flavor and adding thereto a suitable jelling agent, as will be more fully described in the following specification.

In the preparation of jam, the fruit is broken down or crushed to liberate its juices, the water content of the fruit is evaporated by any suitable means, but, preferably at low heat and at sub-atmospheric pressure, so that the fruit flavor is retained. If the juices can be removed without reducing the fruit strictly to pulp, the fruit is broken down only so that the final cooking process carried out by the consumer will restore the fruit approximately to its original shape in the jam. When the fruit and juice are sufficiently concentrated, a fruit acid, such as citric, is added in quantity such as required to cause the product to jell when made into jam. The acid content will obviously vary according to the natural acidity of the fruit used.

The fruit and its juice are combined with "cerelose" which is a crystalline anhydrous dextrose described in the patents to William B. Newkirk No. 1,521,829 and No. 1,693,118, or its equivalent, and pectin, or its equivalent. The "cerelose" content is sufficient to absorb the juice and bring the mass to a suitable consistency for packing. The "cerelose" serves as a drying agent and increases the keeping qualities of the product, at the same time retains the flavoring components in a non-volatile condition, so that in the final preserve the natural flavor of the fruit is present in undiminished strength.

In the preparation of marmalade the peel of the citrus fruits is shredded and after the fruit and its juices have been concentrated as above described, the shredded peel is added to the concentrates together with a small quantity of glycerine or some other suitable ingredient capable of either increasing the specific gravity of the peel to that of the syrup of final treatment, or otherwise causing the peel to remain in suspension therein, during packing and cooling.

The preserve base made as above described is converted into preserve by adding it to a suitable sugar and water syrup and after boiling for one minute, it is ready to be placed in jars and sealed in the ordinary way.

In order that one skilled in the art may clearly understand the invention, the following is an example of an orange marmalade base embodying the features of the invention. The batch would be assembled as follows:

| Ingredients | |
|---|---|
| "Cerelose" | 42 lbs. |
| Citric acid powdered | 6 lbs. |
| Pectin powdered | 5 lbs. 1 oz. |
| Orange juice concentrated to ⅛ its original volume | 2 imperial gal. |

These materials are worked together into a mass in a vertical mixer, then rolled out in a sheet of the proper thickness on top of a layer of orange peel, the orange peel preferably having been loaded with glycerine so that it will have substantially the specific gravity of the mass when thinned with water in the making of the final table product, to cause the peel to remain suspended, evenly distributed throughout the mass and prevent its floating on top of the mass.

This sheet is then cut into cakes or blocks of the proper size, subsequently dried to remove surplus moisture, and then wrapped and packed.

The proportion of orange peel employed in this particular batch is substantially 22 percent by weight of the mass of the finished mixture.

It will be understood that the proportions of fruit or fruit peel may be varied within wide limits and that since the specific gravities of fruits vary, it is not always necessary that the fruit or peel be loaded with glycerine in the manner described. The proportions of the other ingredients may also be varied to a considerable extent since the "cerelose" to be used depends upon the initial degree of concentration of the fruit and fruit juice, also upon the desired stiffness of the final mass. It is not always necessary to add the fruit acid since the native acids of some fruits are sufficient for the purpose, and the amount of pectin requisite to obtain satisfactory jelling depends also upon the nature of the fruit.

While I have in the above description disclosed what I believe to be a preferred and practical embodiment of my invention, it will be understood that the details as described are merely illustrative of one physical embodiment of the broad inventive concept and are not to be regarded as limiting the scope of the invention as claimed.

What I claim is:

1. Process for making a marmalade base comprising essentially concentrating fruit juice, further dehydrating the fruit juice by bringing it into moisture-exchanging relation with a mass of anhydrous dextrose, the proportion of anhydrous dextrose being such as to form with the concentrated fruit juice a thick plastic body, making fruit pieces heavier than normal by impregnating them with glycerine, and incorporating the fruit pieces thus treated into said body.

2. Process for making a marmalade base comprising essentially concentrating fruit juice, further dehydrating the fruit juice by bringing it into moisture-exchanging relation with a mass of anhydrous dextrose, the proportion of anhydrous dextrose being such as to form with the concentrated fruit juice a thick plastic body, making fruit pieces heavier than normal by impregnating them with glycerine, incorporating the fruit pieces thus treated into said body, cutting the body into blocks, and drying the blocks to a state of substantial solidity.

3. Marmalade base unit comprising a block of substantially solid dextrose, hydrated and flavored with concentrated fruit juice, said body including a jellifying agent and having glycerine loaded fruit pieces embedded therein.

JAMES H. STANTON.